US 10,406,902 B2

(12) United States Patent
Masumoto (10) Patent No.: US 10,406,902 B2
(45) Date of Patent: Sep. 10, 2019

(54) GLASS RUN (71) Applicant: NISHIKAWA RUBBER CO., LTD., Hiroshima-shi, Hiroshima (JP)

(72) Inventor: Atsuo Masumoto, Hiroshima (JP)

(73) Assignee: Nishikawa Rubber Co., Ltd., Hiroshima (JP)

(*) Notice: Subject to any disclaimer, the term of this patent is extended or adjusted under 35 U.S.C. 154(b) by 53 days.

(21) Appl. No.: 15/652,754

(22) Filed: Jul. 18, 2017

(65) Prior Publication Data

US 2018/0022196 A1  Jan. 25, 2018

(30) Foreign Application Priority Data

Jul. 19, 2016 (JP) .................................. 2016-141755
Jul. 14, 2017 (JP) .................................. 2017-137749

(51) Int. Cl.
*B60J 10/76* (2016.01)
*B60J 10/50* (2016.01)
*B60J 5/04* (2006.01)

(52) U.S. Cl.
CPC ............. *B60J 10/76* (2016.02); *B60J 5/0402* (2013.01); *B60J 10/50* (2016.02)

(58) Field of Classification Search
CPC ............. B60J 10/76; B60J 10/50; B60J 10/32
See application file for complete search history.

(56) References Cited

U.S. PATENT DOCUMENTS

| 5,158,335 | A | | 10/1992 | Usuta et al. | |
|---|---|---|---|---|---|
| 6,131,342 | A | * | 10/2000 | Miyamoto | B60J 10/24 49/484.1 |
| 6,644,718 | B2 | * | 11/2003 | Nozaki | B60J 10/79 296/146.9 |

(Continued)

FOREIGN PATENT DOCUMENTS

| JP | 2010-179772 | 8/2010 |
|---|---|---|
| JP | 2011-011565 | 1/2011 |

(Continued)

OTHER PUBLICATIONS

Great Britain (GB) Search Report dated Nov. 21, 2017, in connection with corresponding GB Application No. 1711509.8.

*Primary Examiner* — Justin B Rephann
(74) *Attorney, Agent, or Firm* — Mintz Levin Cohn Ferris Glovsky and Popeo, P.C.; David G. Conlin; Steven M. Jensen (57) ABSTRACT

A glass run is attached to a door frame of an automobile to reduce intrusion of noise from an inside of a door of the automobile into an interior of the automobile through the glass run, while allowing a seal lip section to bend easily when a door glass is moved up and down. A partition wall having a reference surface is provided between a vehicle-interior-side seal wall and a vehicle-interior-side seal lip section. The reference surface contains: a first reference point located in the vicinity of a connection portion between the vehicle-interior-side seal lip section and the vehicle-interior-side side wall; a second reference point which is on (Continued)

the vehicle-interior-side side wall and located closer to a bottom wall than the connection portion; and a third reference point located in the vicinity of a tip of the vehicle-interior-side seal lip section.

5 Claims, 5 Drawing Sheets

(56) References Cited

U.S. PATENT DOCUMENTS

| | | | |
|---|---|---|---|
| 7,197,850 B2 * | 4/2007 | Mizutani | B60J 10/24 49/475.1 |
| 7,762,614 B2 * | 7/2010 | Kubo | B29C 66/543 296/146.2 |
| 9,649,921 B2 * | 5/2017 | Bessho | B60J 5/0402 |
| 2005/0028448 A1 | 2/2005 | Mizutani et al. | |
| 2005/0120633 A1 * | 6/2005 | Takase | F16J 15/025 49/441 |
| 2005/0198906 A1 * | 9/2005 | Fujita | B60J 10/24 49/428 |
| 2007/0251152 A1 * | 11/2007 | Takase | B60J 10/74 49/441 |
| 2009/0071077 A1 * | 3/2009 | Takase | B60J 10/277 49/489.1 |
| 2009/0241430 A1 * | 10/2009 | Knape | B60J 10/30 49/489.1 |
| 2013/0133266 A1 * | 5/2013 | Matsuura | E06B 3/42 49/414 |
| 2015/0082709 A1 | 3/2015 | Dosaki | |
| 2016/0214471 A1 | 7/2016 | Bessho et al. | |
| 2016/0355075 A1 * | 12/2016 | Kameoka | B60J 10/50 |
| 2017/0136861 A1 * | 5/2017 | Kojima | B60J 10/76 |
| 2017/0291480 A1 * | 10/2017 | Kameoka | B60J 10/76 |

FOREIGN PATENT DOCUMENTS

| | | |
|---|---|---|
| JP | 2015-63162 A | 4/2015 |
| WO | 2015/033782 A1 | 3/2015 |

* cited by examiner

GLASS RUN

This Nonprivisional application claims priority under 35 U.S.C. § 119 on Patent Application No. 2016-141755 filed in Japan on Jul. 19, 2016 and Patent Application No. 2017-137749 filed in Japan on Jul. 14, 2017, the entire contents of which are hereby incorporated by reference.

TECHNICAL FIELD

The present invention relates to a glass run to be attached to a door frame of an automobile.

BACKGROUND ART

Generally, inside a door frame of an automobile, a glass run for sealing between the door frame and door glass is attached to the door frame. The glass run is molded from rubber or other resin materials, and has a seal lip section which comes into contact with the door glass when the door glass is moved up and down.

The glass run has extrusion molded sections which constitute a top side section, a front vertical side section, and a rear vertical side section. A substantially lower half of each of the front side vertical side section and the rear vertical side section is inserted inside the door and has an opening so as to allow upward and downward movements of the door glass. Accordingly, when the automobile is being driven, sound and wind are transmitted inside the glass run from the openings of the front side vertical side section and the rear vertical side section and reaches an upper section of the glass run so as to be transmitted into an interior of the automobile. The sound and the wind which have reached a passenger's ears may annoy the passenger.

A glass run for an automobile disclosed in Patent Literature 1 is a conventional technique that solves the problem above. The glass run of Patent Literature 1 has a partition wall rib between a side wall and a seal lip section, thereby reducing intrusion of noise and the like from inside a door of the automobile into an interior of the automobile through the glass run.

CITATION LIST

Patent Literature

[Patent Literature 1]
Japanese Patent Application Publication Tokukai No. 2015-63162 (Publication date: Apr. 9, 2015)

SUMMARY OF INVENTION

Technical Problem

However, the technology disclosed in Patent Literature 1 has such a problem that since the partition wall rib is tilted with respect to a right-to-left direction (width direction) of the automobile but not with respect to a front-to-back direction of the automobile, it may be difficult for the seal lip section to bend when the door glass is moved up and down.

The present invention is accomplished in view of the foregoing problem. An object of the present invention is to provide a glass run which not only enables reduction of intrusion of noise or the like from an inside of a door of an automobile into an interior of the automobile through the glass run but also allows a seal lip section to bend easily when door glass is moved up and down.

Solution to Problem

In order to attain the object, a glass run in accordance with an aspect of the present invention is a glass run for being attached to a door frame of an automobile and guiding an upward movement and a downward movement of the door glass, comprising: a bottom wall facing an end surface of the door glass; a side wall extending from a side edge of the bottom wall toward a center of the door glass; a seal lip section for sealing between the door glass and the door frame, the seal lip section extending from a tip of the side wall toward the bottom wall; and a partition wall provided between the side wall and the seal lip section, the partition wall having a reference surface containing (i) a first reference point located in the vicinity of a connection portion between the seal lip section and the side wall, (ii) a second reference point which is on the side wall and located closer to the bottom wall than the connection portion, and (iii) a third reference point located in the vicinity of a tip of the seal lip section, the second reference point or the third reference point being located the lowest in a top-to-bottom direction of the automobile among the first reference point, the second reference point, and the third reference point.

Advantageous Effects of Invention

The glass run in accordance with the aspect of the present invention not only enables reduction of intrusion of noise or the like from an inside of a door of an automobile into an interior of the automobile through the glass run but also allows a seal lip section to bend easily when door glass is moved up and down.

DESCRIPTION OF EMBODIMENTS

Example of Attachment of Glass Run

Figure 1:
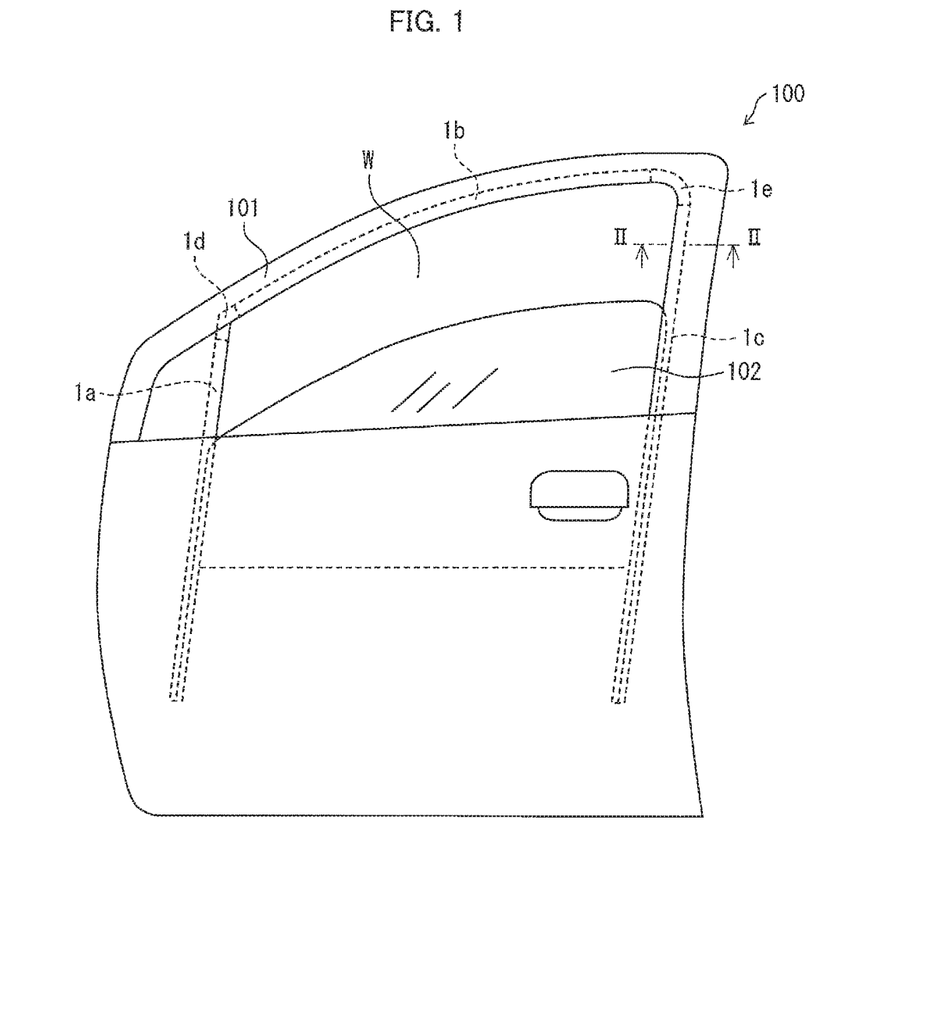
FIG. 1 is a view schematically illustrating an arrangement of a left front door of an automobile to which a glass run in accordance with an embodiment of the present invention is attached.

With reference to FIG. 1, the following description will first discuss a structure of a door to which a glass run in accordance with the present invention is attached. FIG. 1 is a view schematically illustrating a left front door 100 (hereinafter referred to as "door 100") of an automobile to which a left front door glass run in accordance with an embodiment of the present invention is attached.

As illustrated in FIG. 1, a door frame 101 is integrally molded with the door 100, which is attached to a door opening (not shown) of the automobile so as to be openable and closable, and door glass 102 which can be freely moved up and down is attached to the door 100. To the door frame 101, glass runs 1a, 1b, 1c, 1d, and 1e are attached for guiding upward and downward movements of the door glass 102 as well as for sealing between a peripheral section of the door glass 102 and the door frame 101 when the door glass 102 is moved up so as to close a window section W.

Specifically, an upper section glass run 1b is attached along an upper section (a section corresponding to a roof and a front pillar) of the door frame 101, and a front section glass run 1a is attached along a front section of the door frame 101. Further, a rear section glass run 1c in accordance with the embodiment of the present invention is attached along a rear section (a section corresponding to a center pillar) of the door frame 101.

Further, a front corner glass run 1d connects the upper section glass run 1b and the front section glass run 1a to each other, and a rear corner glass run 1e connects the upper section glass run 1b and the glass run 1c to each other.

A molding material for each of the glass runs is, for example, a synthetic rubber or a thermoplastic elastomer. EPDM (ethylene-propylene-diene rubber) is used as the synthetic rubber, and an olefin thermoplastic elastomer or a styrene thermoplastic elastomer is used as the thermoplastic elastomer. Other rubber materials or other elastic materials having a rubber-like elasticity, such as soft polyvinyl chloride, may be used as the molding material.

Note that the above-described arrangement in which the glass runs are attached is merely an example. It is possible, for example, to attach the glass run 1c in accordance with the embodiment of the present invention to the front section of the door frame 101 as well as the rear section of the door frame 101. Further, the door 100 may be, for example, a panel door (press door) or a sash door, and the glass run in accordance with the present invention (including the glass run 1c) may be attached to any type of door of an automobile.

<Structure of Glass Run>

Figure 2:
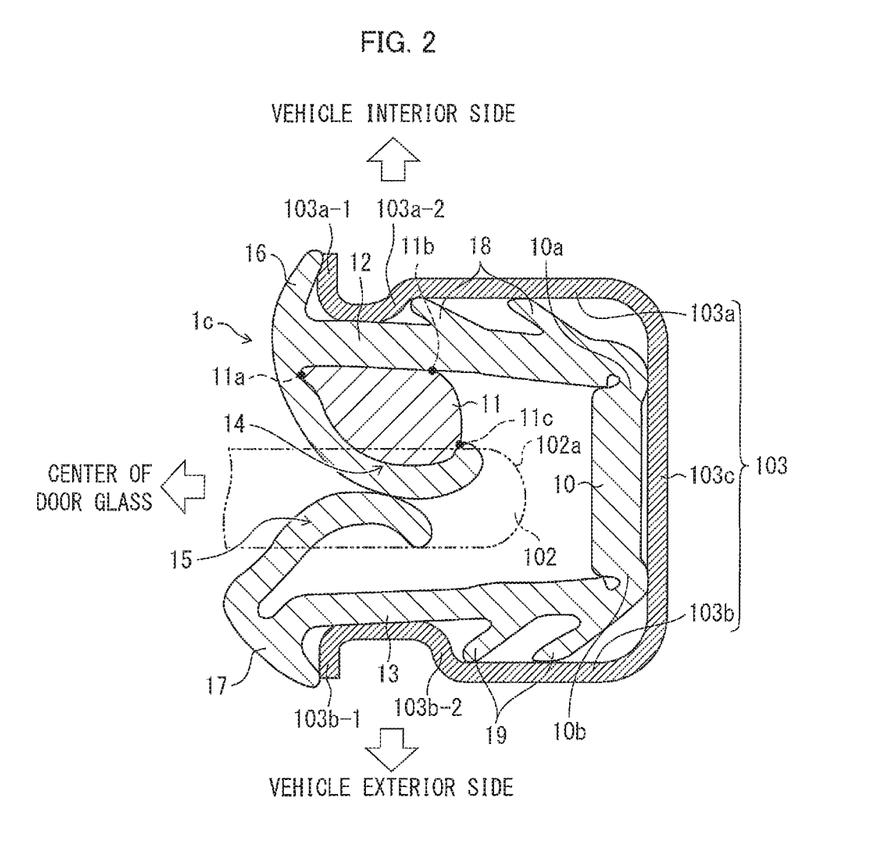
FIG. 2 is a cross-sectional view taken along a line II-II in FIG. 1 and schematically illustrating an arrangement of the glass run illustrated in FIG. 1.

Next, with reference to FIG. 2, the following description will discuss a structure of the glass run in accordance with the present invention. FIG. 2 is a cross-sectional view taken along a line II-II (see FIG. 1) and schematically illustrating an arrangement of the glass run 1c in accordance with the embodiment of the present invention. FIG. 2 shows cross sections of the door frame 101 and the glass run 1c, wherein a lower side and an upper side of a drawing sheet of FIG. 2 correspond to an outer side (a vehicle exterior side) and an inner side (a vehicle interior side), respectively, of the automobile.

As illustrated in FIG. 2, the glass run 1c includes a bottom wall 10, a partition wall 11, a vehicle-interior-side side wall 12, a vehicle-exterior-side side wall 13, a vehicle-interior-side seal lip section 14, a vehicle-exterior-side seal lip section 15, a vehicle-interior-side design lip section 16, a vehicle-exterior-side design lip section 17, vehicle-interior-side holding sections 18, and vehicle-exterior-side holding sections 19.

The bottom wall 10 is a substantially plate-like portion located so as to face a bottom wall section 103c, which connects an automobile inner wall section 103a and an automobile outer wall section 103b to each other, of a substantially U-shaped cross-sectioned holder 103 provided at the rear section of the door frame 101. At this location, the bottom wall 10 faces an end surface 102a of the door glass 102.

The bottom wall 10 has a vehicle-interior-side side edge 10a and a vehicle-exterior-side side edge 10b (hereinafter, simply referred to as "both side edges 10a and 10b") at both side edges of the bottom wall 10. From the both side edges 10a and 10b, each of the vehicle-interior-side side wall 12 having a substantially plate-like shape and the vehicle-exterior-side side wall 13 having a substantially plate-like shape (hereinafter, simply referred to as "both side walls 12 and 13") respectively extends toward a center of the door glass 102.

The bottom wall 10 and the both side walls 12 and 13 constitute a substantially U-shaped cross-sectioned portion. FIG. 2 illustrates a state in which an extrusion molded section of the glass run 1c is attached to the holder 103 of the door frame 101. In this state, normally, the vehicle-interior-side seal lip section 14 and the vehicle-exterior-side seal lip section 15 are in elastic contact with each other. However, in a case where extrusion molding of the extrusion molded section of the glass run 1c is carried out so that the both seal lip sections 14 and 15 of the extrusion molded section obtained are in contact with each other, the door glass 102 cannot be inserted after the extrusion molded section is attached to the holder 103 of the door frame 101. As such, normally, in order to prevent the both seal lip sections 14 and 15 from being in elastic contact with each other, extrusion molding is carried out so that an angle between each of the both side walls 12 and 13 and the bottom wall 10 of the extrusion molded section obtained is greater (the both side walls 12 and 13 are wider apart) than that in a state where the glass run 1c is attached to the automobile. At the time of attachment of the extrusion molded section of the glass run 1c thus manufactured to the holder 103 constituting the door frame 101, an angle between the both side walls 12 and 13 is gradually reduced. Accordingly, the both side walls 12 and 13 are urged against the holder 103 constituting the door frame 101.

The present embodiment employs a structure in which the partition wall 11 is molded between the vehicle-interior-side side wall 12 and the vehicle-interior-side seal lip section 14 inside the glass run 1c, so that a passage for sound or wind is blocked. This allows reducing intrusion of noise or the like from an inside of the door of the automobile into an interior of the automobile through the glass run 1c. The partition wall 11 is a substantially plate-like portion provided between the vehicle-interior-side side wall 12 and the vehicle-interior-side seal lip section 14.

Further, as illustrated in FIG. 2, the partition wall 11 has a reference surface containing a first reference point 11a, a second reference point 11b, and a third reference point 11c. Note that the first reference point 11a is a point located in the vicinity of a connection portion between the vehicle-interior-side seal lip section 14 and the vehicle-interior-side side wall 12. The second reference point 11b is a point which is on the vehicle-interior-side side wall and located closer to the bottom wall 10 than the connection portion. The third reference point 11c is a point which is located in the vicinity of a tip of the vehicle-interior-side seal lip section 14. When the first reference point 11a, the second reference point 11b, and the third reference point 11c are determined, then the reference surface having a substantially triangular shape is naturally determined.

Note that a portion of the reference surface of the partition wall 11 which portion extends from the first reference point 11a to the second reference point 11b is continuously connected to the vehicle-interior-side side wall 12, and a portion of the reference surface of the partition wall 11 which portion extends from the third reference point 11*c* to the first reference point 11*a* is continuously connected to an inner surface of the vehicle-interior-side seal lip section 14. This allows the partition wall 11 to be connected, without a gap, to the vehicle-interior-side seal lip section 14 and the vehicle-interior-side side wall 12, and the portions above constitute a root of the partition wall 11.

As discussed in detail later, among the first reference point 11*a*, the second reference point 11*b*, and the third reference point 11*c* of the partition wall 11, the second reference point 11*b* or the third reference point 11*c* is located the lowest in a top-to-bottom direction of the automobile. Note here that the partition wall 11 is tilted downward from the second reference point 11*b* to the third reference point 11*c*, or upward from the second reference point 11*b* to the third reference point 11*c*. Accordingly, the partition wall 11 having the reference surface is tilted at least with respect to a right-to-left direction (width direction) of the automobile. This allows the vehicle-interior-side seal lip section 14 to bend easily when the door glass 102 is moved up and down. Note here that, more specifically, the partition wall 11 in accordance with the present embodiment is tilted both with respect to the front-to-back direction (right-to-left direction of the sheet of FIG. 2) of the automobile and with respect to the right-to-left direction (top-to-bottom direction of the sheet of FIG. 2) of the automobile, along the top-to-bottom direction of the automobile. Thus, the partition wall 11 in accordance with the present embodiment is three-dimensionally tilted.

Further, in the present embodiment, the vehicle-interior-side seal lip section 14 and the partition wall 11 are connected to each other without a gap therebetween, and the vehicle-interior-side side wall 12 and the partition wall 11 are connected to each other without a gap therebetween. This allows improving shielding properties, sound insulating properties, and sealing properties by the partition wall 11 as compared with an arrangement in which a gap exists between the vehicle-interior-side seal lip section 14 and the partition wall 11 or between the vehicle-interior-side side wall 12 and the partition wall 11.

Further, as in the present embodiment, the partition wall 11 is preferably provided between the vehicle-interior-side seal lip section 14 and the vehicle-interior-side side wall 12, which are provided on the vehicle interior side. When the door glass 102 is moved up so as to close the window section W, the vehicle-interior-side seal lip section 14 and the vehicle-interior-side side wall 12, which are provided on the vehicle interior side, are isolated from the vehicle exterior side via the door glass 102. As such, according to the arrangement above, it is possible to more effectively suppress transmission of sound or wind, which is transmitted inside the glass run 1*c*, into the interior of the automobile as compared with a case in which the partition wall is provided between the vehicle-exterior-side seal lip section 15 and the vehicle-exterior-side side wall 13 which are provided on the vehicle exterior side. Note that the partition wall may be provided between the vehicle-exterior-side seal lip section 15 and the vehicle-exterior-side side wall 13 which are provided on the vehicle exterior side.

The vehicle-interior-side seal lip section 14 and the vehicle-exterior-side seal lip section 15 each seal between the door glass 102 and the door frame 101. The vehicle-interior-side seal lip section 14 extends from a tip of the vehicle-interior-side side wall 12 toward the bottom wall 10 (in FIG. 2, the vehicle-interior-side seal lip section 14 is curved). The vehicle-exterior-side seal lip section 15 extends from a tip of the vehicle-exterior-side side wall 13 toward the bottom wall 10 (in FIG. 2, the vehicle-exterior-side seal lip section 15 is curved).

The vehicle-interior-side seal lip section 14 is greater in length and thickness than the vehicle-exterior-side seal lip section 15. Accordingly, in a state where the both seal lip sections 14 and 15 abut against the door glass 102, the door glass 102 can be located slightly on the vehicle exterior side (outdoor side), so that a step between the door frame 101 and the door glass 102 can be reduced. This not only reduces air resistance and wind noise while the automobile is being driven, but also allows achieving a favorable outer appearance in terms of design.

From the tip of the vehicle-interior-side side wall 12, the vehicle-interior-side design lip section 16 extends toward a tip 103*a*-1 of the automobile inner wall section 103*a* of the holder 103. The vehicle-interior-side design lip section 16 comes into elastic contact with the tip 103*a*-1 of the automobile inner wall section 103*a*. Meanwhile, from the tip of the vehicle-exterior-side side wall 13, the vehicle-exterior-side design lip section 17 extends toward a tip 103*b*-1 of the automobile outer wall section 103*b* of the holder 103. The vehicle-exterior-side design lip section 17 comes into elastic contact with the tip 103*b*-1 of the automobile outer wall section 103*b*.

On a surface of the vehicle-interior-side side wall 12 which surface faces the vehicle interior side, two vehicle-interior-side holding sections 18 each of which has a lip-shaped cross section are provided. The automobile inner wall section 103*a* of the holder 103 has, at an end thereof, a bent section 103*a*-2 with which one of the two vehicle-interior-side holding sections 18 is engaged. The other of the two vehicle-interior-side holding sections 18 abuts against a surface of the automobile inner wall section 103*a* which surface faces the vehicle-interior-side side wall 12. The two vehicle-interior-side holding sections 18 and the above-described vehicle-interior-side design lip section 16 allow the vehicle-interior-side side wall 12 to be held against the holder 103.

Meanwhile, on a surface of the vehicle-exterior-side side wall 13 on the vehicle exterior side, two vehicle-exterior-side holding sections 19 each having a lip-shaped cross section are provided. The automobile outer wall section 103*b* of the holder 103 has, at an end thereof, a bent section 103*b*-2 with which one of the two vehicle-exterior-side holding sections 19 is engaged. The other one of the two vehicle-exterior-side holding sections 19 abuts against a surface of the automobile outer wall section 103*b* which surface faces the vehicle-exterior-side side wall 13. The two vehicle-exterior-side holding sections 19 and the above-described vehicle-exterior-side design lip section 17 allow the vehicle-exterior-side side wall 13 to be held against the holder 103.

Note that, the vehicle-interior-side holding sections 18 and the vehicle-exterior-side holding sections 19 can each be designed to have any size and shape and can each be provided in any number and arrangement, in accordance with the shape, size, and the like of the holder 103.

Example 1 of Arrangement in which Partition Wall is Provided to Glass Run

Figure 3:
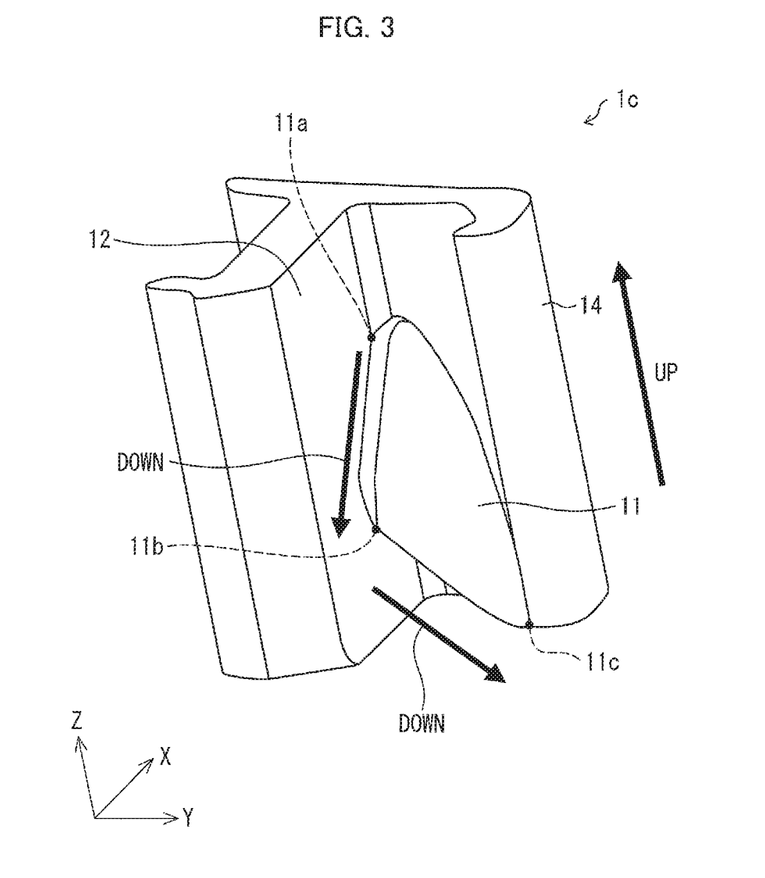
FIG. 3 is a perspective view illustrating Example 1 of an arrangement in which a partition wall is provided to the glass run.

Next, with reference to FIG. 3, the following description will discuss Example 1 of an arrangement in which the partition wall 11 is provided to the glass run 1*c* in accordance with the embodiment of the present invention. FIG. 3 shows an enlarged view of a characteristic portion of the present invention, wherein the vehicle-interior-side side wall 12 and the vehicle-interior-side seal lip section 14 are viewed from a position of the bottom wall 10, and the bottom wall 10 is omitted.

In XYZ coordinates shown in FIG. 3, an X-axis positive direction is oriented toward a front of the automobile, a Y-axis positive direction is oriented toward the outer side of the automobile, and a Z-axis positive direction is oriented toward a top of the automobile. As illustrated in FIG. 3, the partition wall 11 in accordance with Example 1 is provided between the vehicle-interior-side seal lip section 14 and the vehicle-interior-side side wall 12, which are provided on the vehicle interior side.

The partition wall 11 in accordance with Example 1 is arranged such that the second reference point 11b is located lower than the first reference point 11a in the top-to-bottom direction (Z-axis direction) of the automobile, and the partition wall 11 is tilted downward from the first reference point 11a to the second reference point 11b. Further, the partition wall 11 in accordance with Example 1 is arranged such that the third reference point 11c is located lower than the second reference point 11b in the top-to-bottom direction (Z-axis direction) of the automobile, and the partition wall 11 is tilted downward from the second reference point 11b to the third reference point 11c so as to form an acute angle. This allows the partition wall 11 to bend easily, and accordingly enables an improvement in durability (prevention of breakage of a joint portion of the partition wall 11) at the time when the door glass 102 is moved up and down.

In other words, a line (an edge of the partition wall 11) connecting between the first reference point 11a and the second reference point 11b, which are located on a side of an inner surface of the vehicle-interior-side side wall 12, is tilted downward (along the Z-axis direction) with respect to the front-to-back direction of the automobile. Further, a line (an edge of the partition wall 11) connecting between the second reference point 11b, which is located on the side of the inner surface of the vehicle-interior-side side wall 12, and the third reference point 11c, which is located on a side of the inner surface of the vehicle-interior-side seal lip section 14, is tilted downward (along the Z-axis direction) so as to extend in the width direction (Y-axis direction) of the automobile and be connected to the tip of the vehicle-interior-side seal lip section 14. The partition wall 11 is connected, without a gap, to the inner surface of the vehicle-interior-side side wall 12 along the line connecting between the first reference point 11a and the second reference point 11b, and is connected, without a gap, to the inner surface of the vehicle-interior-side seal lip section 14 along the line connecting between the first reference point 11a and the third reference point 11c.

In a case where a line connecting the second reference point 11b with the third reference point 11c is substantially perpendicular to the top-to-bottom direction (Z-axis direction) of the automobile, the door glass 102 tends to receive resistance more easily when moved up and down. It is therefore preferable that, as described above, the line connecting the second reference point 11b with the third reference point 11c along the width direction (Y-axis direction) of the automobile be tilted so as to form an acute angle with respect to the top-to-bottom direction (Z-axis direction) of the automobile.

Further, the line connecting between the first reference point 11a and the second reference point 11b is tilted downward toward the bottom wall 10 along the front-to-back direction (X-axis direction) of the automobile. As such, even in a case where the vehicle-interior-side seal lip section 14 bends toward the vehicle-interior-side side wall 12 when the door glass 102 is moved up and down along a direction indicated by an arrow UP in FIG. 3, the partition wall 11 neither inhibits the bending of the vehicle-interior-side seal lip section 14 by stretching with tension nor is warped. It is thus possible to cause the partition wall 11 to fall over toward the vehicle-interior-side side wall 12 with reference to the line connecting between the first reference point 11a and the second reference point 11b which are connected to the vehicle-interior-side side wall 12.

Further, the partition wall 11 in accordance with Example 1 is arranged such that the third reference point 11c is located the lowest in the top-to-bottom direction (Z-axis direction) of the automobile among the first reference point 11a, the second reference point 11b, and the third reference point 11c. This allows water having reached the partition wall 11 to flow easily from the first reference point 11a toward the third reference point 11c, and accordingly allows making it more difficult for the water to stay on the partition wall.

Further, according to the arrangement above, the partition wall 11 in accordance with Example 1 is tilted at least with respect to the right-to-left direction (width direction) of the automobile, and also tilted with respect to the front-to-back direction of the automobile. This allows the vehicle-interior-side seal lip section 14 to bend easily when the door glass 102 is moved up and down, even though the partition wall 11 is connected, without a gap, to both of the inner surface of the vehicle-interior-side side wall 12 and the inner surface of the vehicle-interior-side seal lip section 14.

Example 2 of Arrangement in which Partition Wall is Provided to Glass Run

Figure 4:
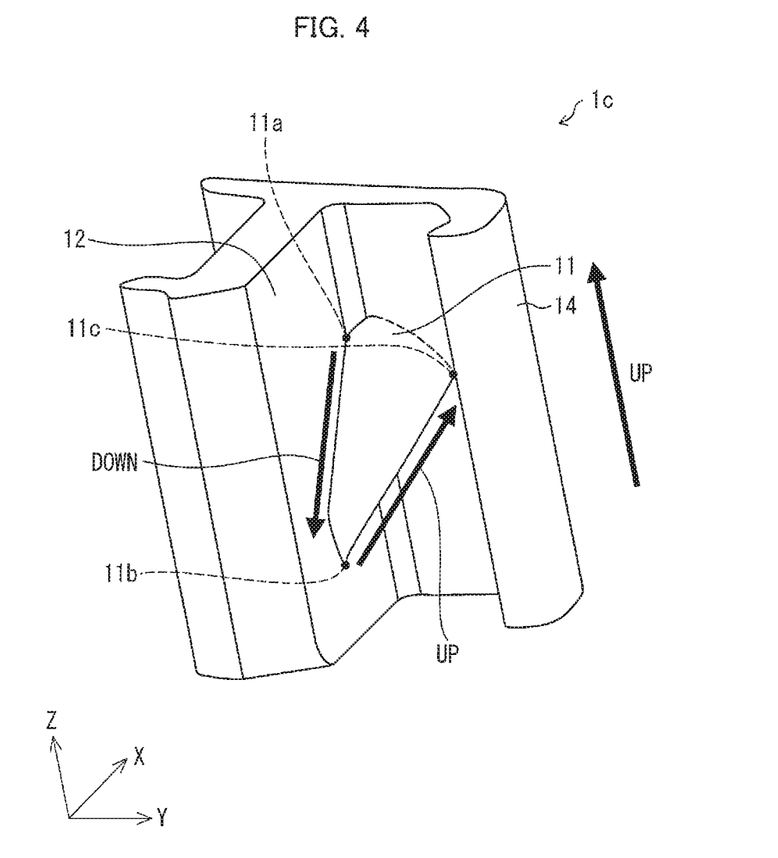
FIG. 4 is a perspective view illustrating Example 2 of an arrangement in which a partition wall is provided to the glass run.

Next, with reference to FIG. 4, the following description will discuss Example 2 of an arrangement in which the partition wall 11 is provided to the glass run 1c in accordance with the embodiment of the present invention. As illustrated in FIG. 4, the partition wall 11 in accordance with Example 2 is provided between the vehicle-interior-side seal lip section 14 and the vehicle-interior-side side wall 12, which are provided on the vehicle interior side.

The partition wall 11 in accordance with Example 2 is arranged such that the second reference point 11b is located lower than the first reference point 11a in the top-to-bottom direction (Z-axis direction) of the automobile, and the partition wall 11 is tilted downward from the first reference point 11a to the second reference point 11b. Further, the partition wall 11 in accordance with Example 2 is arranged such that the third reference point 11c is located higher than the second reference point 11b in the top-to-bottom direction (Z-axis direction) of the automobile, and the partition wall 11 is tilted upward from the second reference point 11b to the third reference point 11c so as to form an acute angle. This allows the partition wall 11 to bend easily, and accordingly enables an improvement in durability (prevention of breakage of a joint portion of the partition wall 11) at the time when the door glass 102 is moved up and down.

In other words, a line (an edge of the partition wall 11) connecting between the first reference point 11a and the second reference point 11b, which are located on a side of an inner surface of the vehicle-interior-side side wall 12, is tilted downward (along the Z-axis direction) with respect to the front-to-back direction of the automobile. Further, a line (an edge of the partition wall 11) connecting between the second reference point 11b, which is located on the side of the inner surface of the vehicle-interior-side side wall 12, and the third reference point 11c, which is located on a side of the inner surface of the vehicle-interior-side seal lip section 14, is tilted upward (along the Z-axis direction) so as to extend in the width direction (Y-axis direction) of the automobile and be connected to the tip of the vehicle-interior-side seal lip section 14. The partition wall 11 is connected, without a gap, to the inner surface of the vehicle-interior-side side wall 12 along the line connecting between the first reference point 11a and the second reference point 11b, and is connected, without a gap, to the inner surface of the vehicle-interior-side seal lip section 14 along the line connecting between the first reference point 11a and the third reference point 11c.

In a case where a line connecting the second reference point 11b with the third reference point 11c is substantially perpendicular to the top-to-bottom direction (Z-axis direction) of the automobile, the door glass 102 tends to receive resistance more easily when moved up and down. It is therefore preferable that, as described above, the line connecting the second reference point 11b with the third reference point 11c along the width direction (Y-axis direction) of the automobile be tilted so as to form an acute angle with respect to the top-to-bottom direction (Z-axis direction) of the automobile.

Further, the partition wall 11 in accordance with Example 2 is arranged such that the second reference point 11b is located the lowest in the top-to-bottom direction (Z-axis direction) of the automobile among the first reference point 11a, the second reference point 11b, and the third reference point 11c. This allows water having reached the partition wall 11 to flow easily from the first reference point 11a toward the second reference point 11b, and accordingly allows making it more difficult for the water to stay on the partition wall.

Note that although the third reference point 11c is located lower than the first reference point 11a in the top-to-bottom direction of the automobile in the present embodiment, it is possible to employ an arrangement in which the first reference point 11a is located lower than the third reference point 11c. In consideration of bending of the vehicle-interior-side seal lip section 14 with respect to the door glass 102, the first reference point 11a and the third reference point 11c are preferably not located at the same height.

Further, according to the arrangement above, the partition wall 11 in accordance with Example 2 is tilted at least with respect to the right-to-left direction (width direction) of the automobile, and also tilted with respect to the front-to-back direction of the automobile. This allows the vehicle-interior-side seal lip section 14 to bend easily when the door glass 102 is moved up and down, even though the partition wall 11 is connected, without a gap, to both of the inner surface of the vehicle-interior-side side wall 12 and the inner surface of the vehicle-interior-side seal lip section 14.

Example 3 of Arrangement in which Partition Wall is Provided to Glass Run

Figure 5:
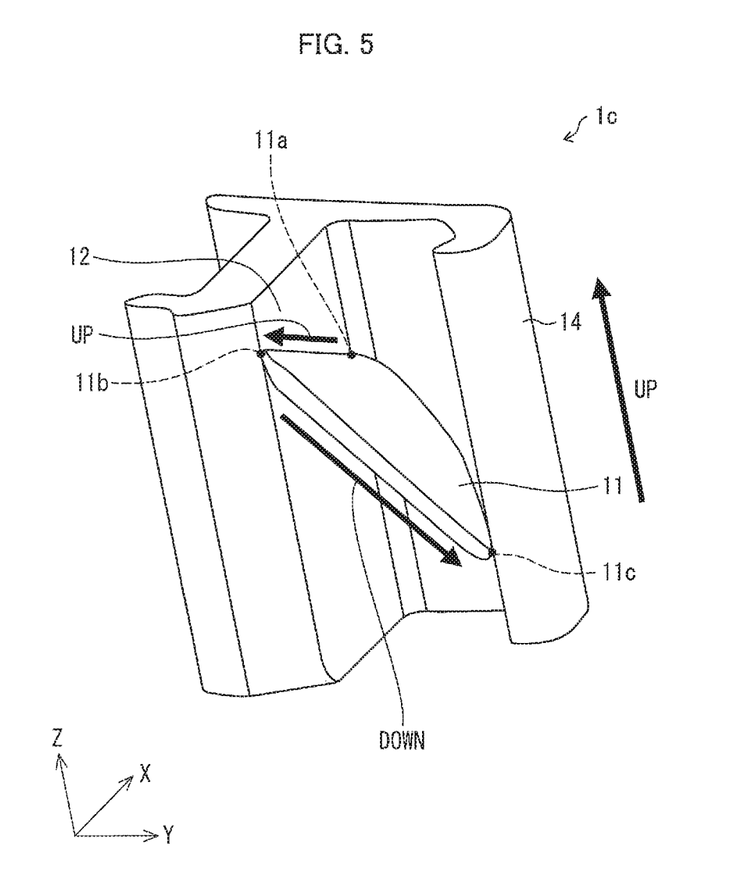
FIG. 5 is a perspective view illustrating Example 3 of an arrangement in which a partition wall is provided to the glass run.

Next, with reference to FIG. 5, the following description will discuss Example 3 of an arrangement in which the partition wall 11 is provided to the glass run 1c in accordance with the embodiment of the present invention. As illustrated in FIG. 5, the partition wall 11 in accordance with Example 3 is provided between the vehicle-interior-side seal lip section 14 and the vehicle-interior-side side wall 12, which are provided on the vehicle interior side.

The partition wall 11 in accordance with Example 3 is arranged such that the second reference point 11b is located higher than the first reference point 11a in the top-to-bottom direction (Z-axis direction) of the automobile, and the partition wall 11 is tilted upward from the first reference point 11a to the second reference point 11b. Further, the partition wall 11 in accordance with Example 3 is arranged such that the third reference point 11c is located lower than the second reference point 11b (and the first reference point 11a) in the top-to-bottom direction (Z-axis direction) of the automobile, and the partition wall 11 is tilted downward from the second reference point 11b to the third reference point 11c so as to form an acute angle. This allows the partition wall 11 to bend easily, and accordingly enables an improvement in durability (prevention of breakage of a joint portion of the partition wall 11) at the time when the door glass 102 is moved up and down.

In other words, a line (an edge of the partition wall 11) connecting between the first reference point 11a and the second reference point 11b, which are located on a side of an inner surface of the vehicle-interior-side side wall 12, is tilted upward (along the Z-axis direction) with respect to the front-to-back direction of the automobile. Further, a line (an edge of the partition wall 11) connecting between the second reference point 11b, which is located on the side of the inner surface of the vehicle-interior-side side wall 12, and the third reference point 11c, which is located on a side of the inner surface of the vehicle-interior-side seal lip section 14, is tilted downward (along the Z-axis direction) so as to extend in the width direction (Y-axis direction) of the automobile and be connected to the tip of the vehicle-interior-side seal lip section 14. The partition wall 11 is connected, without a gap, to the inner surface of the vehicle-interior-side side wall 12 along the line connecting between the first reference point 11a and the second reference point 11b, and is connected, without a gap, to the inner surface of the vehicle-interior-side seal lip section 14 along the line connecting between the first reference point 11a and the third reference point 11c.

In a case where a line connecting the second reference point 11b with the third reference point 11c is substantially perpendicular to the top-to-bottom direction (Z-axis direction) of the automobile, the door glass 102 tends to receive resistance more easily when moved up and down. It is therefore preferable that, as described above, the line connecting the second reference point 11b with the third reference point 11c along the width direction (Y-axis direction) of the automobile be tilted so as to form an acute angle with respect to the top-to-bottom direction (Z-axis direction) of the automobile.

Further, the partition wall 11 in accordance with Example 3 is arranged such that the third reference point 11c is located the lowest in the top-to-bottom direction (Z-axis direction) of the automobile among the first reference point 11a, the second reference point 11b, and the third reference point 11c. This allows water having reached the partition wall 11 to flow easily from the first reference point 11a (or the second reference point 11b) toward the third reference point 11c, and accordingly allows making it more difficult for the water to stay on the partition wall.

Further, according to the arrangement above, the partition wall 11 in accordance with Example 3 is tilted at least with respect to the right-to-left direction (width direction) of the automobile, and also tilted with respect to the front-to-back direction of the automobile. This allows the vehicle-interior-side seal lip section 14 to bend easily when the door glass 102 is moved up and down, even though the partition wall 11 is connected, without a gap, to both of the inner surface of the vehicle-interior-side side wall 12 and the inner surface of the vehicle-interior-side seal lip section 14.

CONCLUSION

In order to attain the object, a glass run in accordance with an aspect of the present invention is a glass run for being attached to a door frame of an automobile and guiding an upward movement and a downward movement of the door glass, comprising: a bottom wall facing an end surface of the door glass; a side wall extending from a side edge of the bottom wall toward a center of the door glass; a seal lip section for sealing between the door glass and the door frame, the seal lip section extending from a tip of the side wall toward the bottom wall; and a partition wall provided between the side wall and the seal lip section, the partition wall having a reference surface containing (i) a first reference point located in the vicinity of a connection portion between the seal lip section and the side wall, (ii) a second reference point which is on the side wall and located closer to the bottom wall than the connection portion, and (iii) a third reference point located in the vicinity of a tip of the seal lip section, the second reference point or the third reference point being located the lowest in a top-to-bottom direction of the automobile among the first reference point, the second reference point, and the third reference point.

According to the arrangement above, the partition wall is provided between the side wall and the seal lip section. This allows reducing intrusion of noise or the like from an inside of a door of the automobile into an interior of the automobile through the glass run.

Further, according to the arrangement above, the second reference point or the third reference point is located the lowest in the top-to-bottom direction of the automobile among the first reference point, the second reference point, and the third reference point which are contained in the reference surface of the partition wall. Note here that the first reference point is a point which is located in the vicinity of the connection portion between the seal lip section and the side wall, the second reference point is a point which is on the side wall and located closer to the bottom wall than the connection portion, and the third reference point is a point which is located in the vicinity of the tip of the seal lip section. In this arrangement, the partition wall is tilted downward from the second reference point toward the third reference point or tilted upward from the second reference point toward the third reference point. Accordingly, the partition wall having the reference surface is tilted at least with respect to a right-to-left direction of the automobile. This allows the seal lip section to bend easily when the door glass is moved up and down.

Thus, the glass run in accordance with the aspect of the present invention not only enables reduction of intrusion of noise or the like from the inside of the door of the automobile into the interior of the automobile through the glass run but also allows the seal lip section to bend easily when the door glass is moved up and down.

Further, the glass run in accordance with the aspect of the present invention may be arranged such that the third reference point is located the lowest in the top-to-bottom direction of the automobile among the first reference point, the second reference point, and the third reference point. The arrangement allows water having reached the partition wall to flow easily from the first reference point toward the third reference point, and accordingly allows making it more difficult for the water to stay on the partition wall.

Further, the glass run in accordance with the aspect of the present invention may be arranged such that the second reference point is located the lowest in the top-to-bottom direction of the automobile among the first reference point, the second reference point, and the third reference point. The arrangement allows water having reached the partition wall to flow easily from the first reference point toward the second reference point, and accordingly allows making it more difficult for the water to stay on the partition wall.

Further, the glass run in accordance with the aspect of the present invention is preferably arranged such that: the seal lip section and the partition wall are connected to each other without a gap therebetween; and the side wall and the partition wall are connected to each other without a gap therebetween. The arrangement allows improving shielding properties, sound insulating properties, and sealing properties by the partition wall as compared with an arrangement in which a gap exists between the seal lip section and the partition wall or between the side wall and the partition wall.

Further, the glass run in accordance with the aspect of the present invention is preferably arranged such that the partition wall is provided between the seal lip section and the side wall which are provided on an inner side of the automobile. When the door glass is moved up so as to close a window section, the seal lip section and the side wall, which are provided on the inner side of the automobile, are isolated from the vehicle exterior side via the door glass. As such, according to the arrangement above, it is possible to more effectively suppress transmission of sound or wind, which is transmitted inside the glass run, into the interior of the automobile as compared with a case in which the partition wall is provided between a seal lip section and a side wall which are provided on the vehicle exterior side.

SUPPLEMENTARY NOTE

The present invention is not limited to the embodiments, but can be altered by a skilled person in the art within the scope of the claims. The present invention also encompasses, in its technical scope, any embodiment derived by combining technical means disclosed in differing embodiments. Further, it is possible to form a new technical feature by combining the technical means disclosed in the respective embodiments.

REFERENCE SIGNS LIST

1c: glass run
10: bottom wall
10a: vehicle-interior-side side edge
10b: vehicle-exterior-side side edge
11: partition wall
11a: first reference point
11b: second reference point
11c: third reference point
12: vehicle-interior-side side wall
13: vehicle-exterior-side side wall
14: vehicle-interior-side seal lip section
15: vehicle-exterior-side seal lip section
101: door frame
102: door glass
102a: end surface

The invention claimed is:
1. A glass run for being attached along a pillar of a door frame of an automobile and guiding an upward movement and a downward movement of a door glass, comprising:

a bottom wall facing an end surface of the door glass;

a side wall extending from a side edge of the bottom wall toward a center of the door glass;

a seal lip section for sealing between the door glass and the door frame, the seal lip section extending from a tip of the side wall toward the bottom wall; and a partition wall provided between the side wall and the seal lip section, the partition wall having a surface containing (i) a first point located in a connection portion between the seal lip section and the side wall, (ii) a second point which is on the side wall and located closer to the bottom wall than the connection portion, and (iii) a third point located in a tip of the seal lip section, the partition wall being permanently connected, without a gap, to an inner surface of the side wall along a line connecting the first point and the second point, and being permanently connected, without a gap, to an inner surface of the seal lip section along a line connecting the first point and the third point, the partition wall permanently dividing the inner surface of the seal lip section into an upper part and a lower part, and the second point being located the lowest in a top-to-bottom direction of the automobile among the first point, the second point, and the third point.

2. The glass run as set forth in claim 1, wherein the partition wall is provided between the seal lip section and the side wall which are provided on an inner side of the automobile.

3. The glass run as set forth in claim 1, wherein the third point is located lower than the first point in the top-to-bottom direction of the automobile.

4. The glass run as set forth in claim 3, wherein the partition wall is tilted downward from the first point to the second point, and the partition wall is tilted upward from the second point to the third point so as to form an acute angle.

5. The glass run as set forth in claim 1, wherein the partition wall is tilted downward from the first point to the second point, and the partition wall is tilted upward from the second point to the third point so as to form an acute angle.

* * * * *